(No Model.)
G. MARLAND.
COUPLING FOR JOINTS OF GAS CONDUITS.
No. 338,093. Patented Mar. 16, 1886.
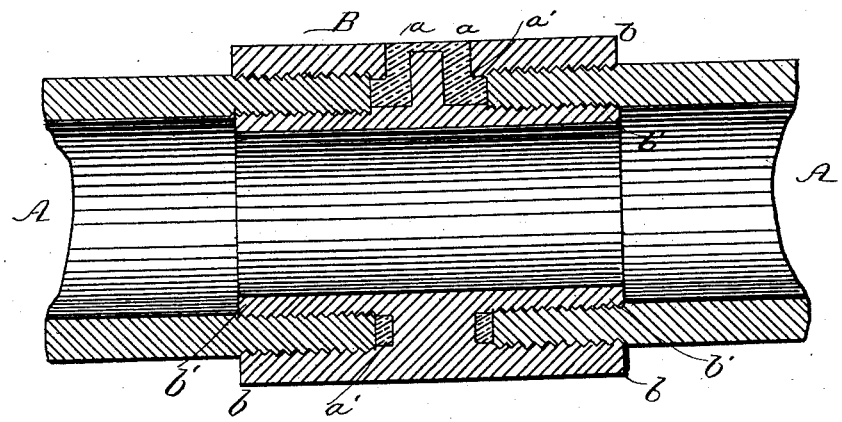
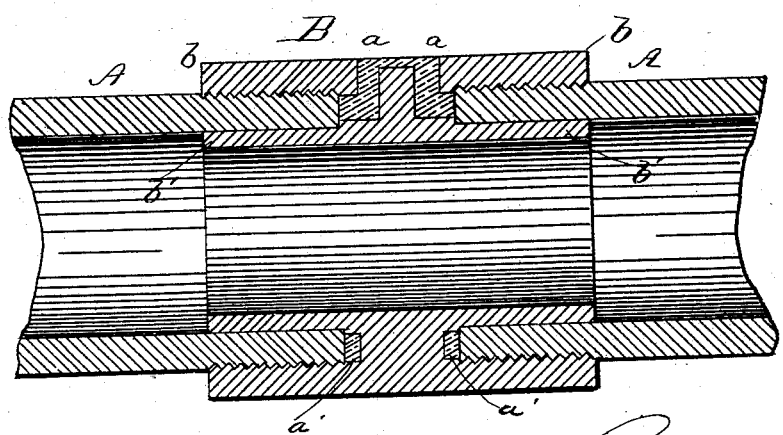
Witnesses.
Alva A. Moore
A. A. Connolly
George Marland
Inventor
Connolly Bro
Attys.

UNITED STATES PATENT OFFICE.

GEORGE MARLAND, OF PITTSBURG, PENNSYLVANIA, ASSIGNOR OF ONE-HALF TO HUGH HAGAN, OF SAME PLACE.

COUPLING FOR JOINTS OF GAS-CONDUITS.

SPECIFICATION forming part of Letters Patent No. 338,093, dated March 16, 1886.

Application filed January 11, 1886. Serial No. 188,167. (No model.)

*To all whom it may concern:*

Be it known that I, GEORGE MARLAND, a citizen of the United States, residing at Pittsburg, in the county of Allegheny and State of Pennsylvania, have invented certain new and useful Improvements in Couplings for Natural-Gas Conduits; and I do hereby declare the following to be a full, clear, and exact description of the invention, reference being had to the accompanying drawings, which form part of this specification.

This invention has relation to couplings for pipes or tubes, and especially relates to couplings for the pipes or conduits used in the conveyance of natural gas.

My invention has for its object the provision of a novel form of coupling-sleeve adapted to be applied to pipes or conduits of the ordinary form or of special construction; and my invention consists in a coupling-sleeve having at each end an annular collar, screw-threaded inside and adapted to receive the screw-threaded end of the pipe or conduit and a bush or collar cast integral with the coupling-sleeve and adapted to enter the end of the pipe or conduit, so as to protect the threads and other portions of the coupling from sand or other solid particles passing through the pipe.

My invention further consists in the novel construction of a coupling-sleeve adapted for coupling wrought-iron pipe, and formed of a casting having at each end concentric collars or flanges between which the pipe ends are inserted and secured.

My invention further consists in the novel construction of a coupling-sleeve for pipes or tubes, and in the novel means whereby the joints between the pipes and coupling are sealed against leakage, the sleeve being a casting with annular and concentric flanges or collars at each end formed integral with the sleeve and having channels or grooves for the reception of metallic packing and holes or ports for the reception of said packing in a molten condition, all as hereinafter described.

Referring to the accompanying drawings, Figure 1 is a central longitudinal section of a coupling-sleeve embodying my invention, and Fig. 2 a sectional view of a modification.

A A designate the sections of pipe to be coupled, and B the coupling-sleeve.

The pipes are intended to be wrought-iron, but I do not limit myself thereto, as cast-iron pipes may, if desired, be used.

For the purposes of my invention the pipes are screw-threaded on their outer surfaces at the ends, and, if desired, also screw-threaded on the interior surfaces.

The coupling-sleeve B consists of an annular casting provided on either side of its middle part with the annular portions $b\ b'$, between which the pipe ends are inserted and secured.

According to the construction shown in Fig. 1 the flanges $b\ b'$ are threaded, the first on its interior surface and the other on its outer surface, and in order to fit and adapt the pipes thereto the latter are threaded both on their inner and outer surfaces, thus producing a double screw, or an inner and outer screw, which will the better secure the pipe ends in place and render the joints closer and tighter than they would otherwise be.

According to the construction shown in Fig. 2 the collar or flange $b'$ is plain—that is, it is not threaded on its outer surface, while the interior of the pipe is also plain, hence the pipe only screws into the flange $b$, but fits closely upon the flange $b'$.

The principal object of the flange $b'$ is to protect the threads and other portions of the joint; hence, when said flange is made plain on its outer surface, it need not be of the same length as the flange $b$ but may be very short or only long enough to cover and protect the joint formed at the junction of the inner end of the pipe with the coupling-sleeve.

In practice it will probably be found that the flange $b'$ is sufficient to seal the joint against leakage; but I have provided means for increasing the security of the seal, and for this purpose form openings or ports $a$ on the upper side of the sleeve, said ports communicating with the sockets formed between the flanges $b\ b'$ or with grooves $a'$, formed at the inner ends of said sockets and extending around the entire sockets.

Solid lead or other packing material may be inserted in the sockets at their inner ends before the pipes are inserted, or the pipes may be first inserted and molten lead poured into the spaces left between the ends of the pipes and the inner ends of the sockets through the ports $a$.

Having described my invention, what I desire to claim and secure by Letters Patent is—

1. A coupling for pipes consisting of cylindrical casting having formed integral therewith at each end the annular concentric flanges $b\ b'$, forming a socket for the reception of the pipe end, the flange $b$ being screw-threaded on its inner surface, substantially as described.

2. The coupling for pipes consisting of the cast-iron cylindrical coupling-sleeve B, having cast integral therewith the annular concentric flanges $b\ b'$, forming sockets for the reception of the pipe ends, and having the ports $a$, communicating with the sockets and adapted for the insertion of a packing metal.

3. The combination, with the pipe or conduit sections A A, having their ends screw-threaded on their inner and outer surfaces, of the coupling-sleeve B, consisting of a cylindrical casting, having cast integral therewith the annular concentric flanges $b\ b'$, screw-threaded, respectively, on their inner and outer surfaces, substantially as described.

In testimony that I claim the foregoing I have hereunto set my hand this 8th day of January, 1886.

GEORGE MARLAND.

Witnesses:
  THOS. A. CONNOLLY,
  JNO. F. ATCHESON.